C. M. LEECH.
TRANSMISSION GEAR.
APPLICATION FILED APR. 30, 1910.

993,079.

Patented May 23, 1911.
3 SHEETS—SHEET 2.

Witnesses
J. S. Freeman.
B. F. Fishburne.

Inventor
Charles M. Leech,
By C. L. Parker,
Attorney

UNITED STATES PATENT OFFICE.

CHARLES M. LEECH, OF LIMA, OHIO.

TRANSMISSION-GEAR.

993,079.  Specification of Letters Patent.  Patented May 23, 1911.

Application filed April 30, 1910. Serial No. 558,550.

*To all whom it may concern:*

Be it known that I, CHARLES M. LEECH, a citizen of the United States, residing at Lima, in the county of Allen and State of Ohio, have invented certain new and useful Improvements in Transmission-Gears, of which the following is a specification.

My invention relates to a variable speed transmission gear, to be used upon automobiles or the like.

An important object of this invention is to provide a device of the character described, which is controlled by a single lever, and which is positive and reliable in its operation.

Other objects and advantages of my invention will appear hereinafter.

Figure 1:
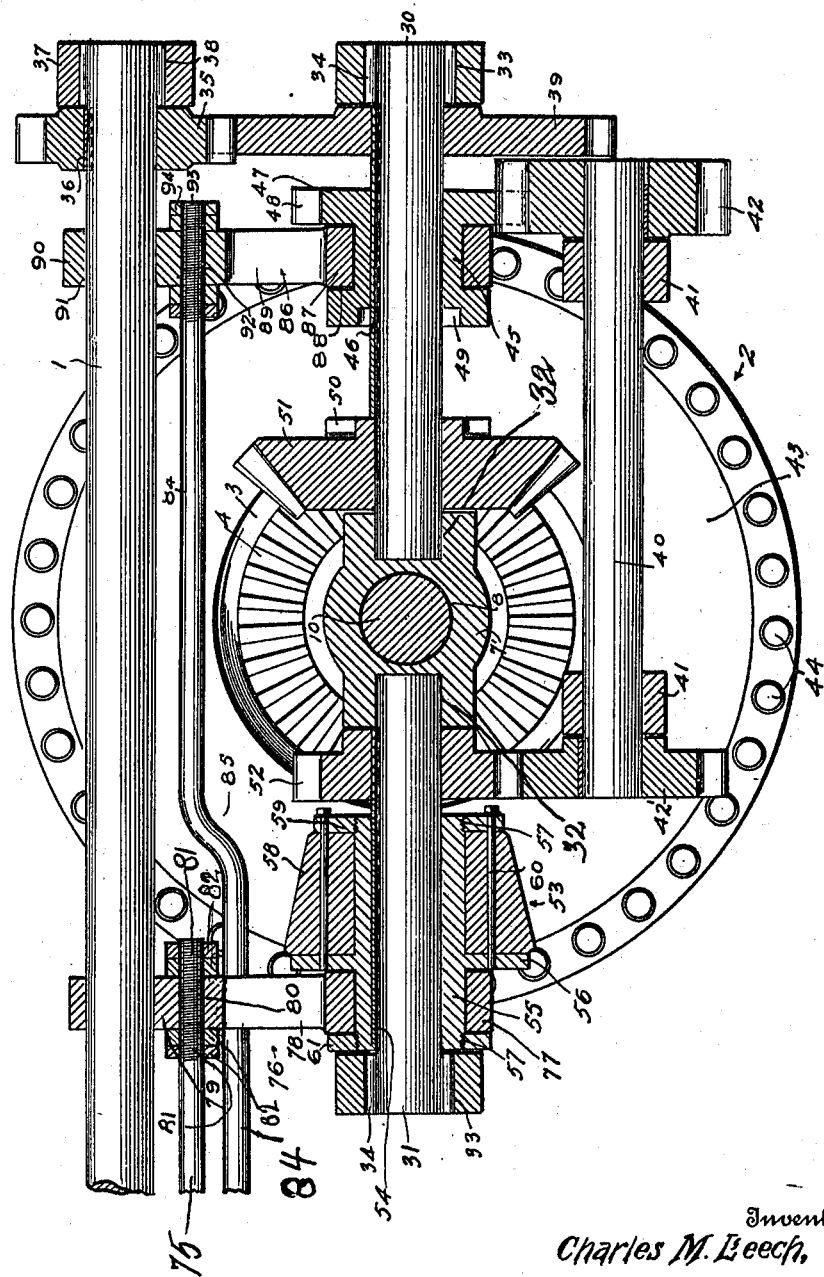
Figure 2:
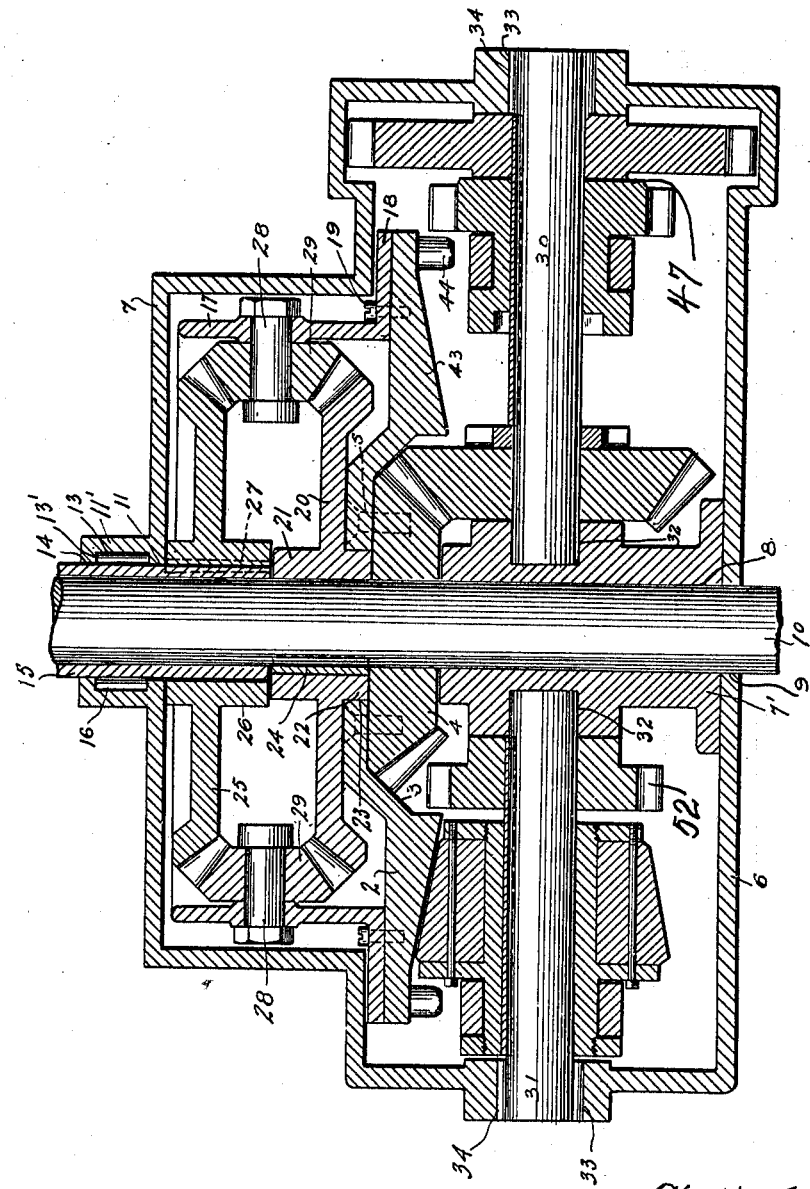
Figure 3:
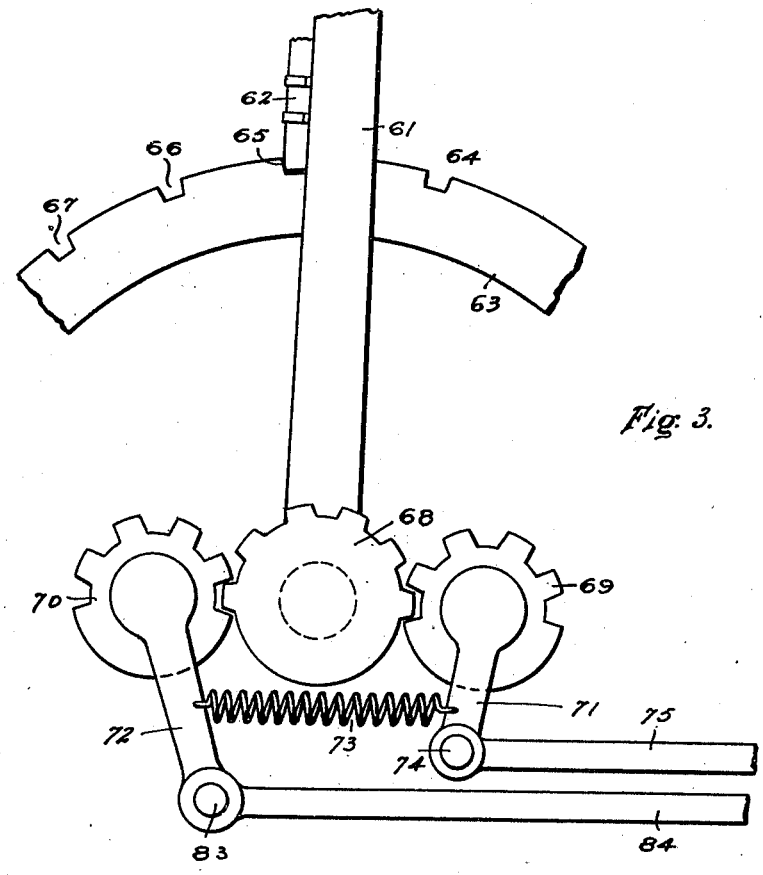

In the accompanying drawings, forming a part of this specification and in which like numerals are used to designate like parts throughout the same, Figure 1 is a central vertical section through the device, certain parts being shown in section. Fig. 2 is a central horizontal section through the same, parts being shown in elevation and, Fig. 3 is a side view of the controlling lever and associated parts.

In the drawings, wherein is illustrated a preferred embodiment of my invention, the numeral 1 designates a driving shaft, which in this instance is the engine shaft of an automobile. The engine and its connection with the driving shaft 1, since they may be of any well known or preferred form, are not shown. Arranged upon one side of this driving shaft, is a driven disk 2, having its center provided with a circular recess 3 for the reception of a bevel gear 4, which is rigidly connected to the disk 2, by means of screws 5. The disk 2 is inclosed, as shown, within a rectangular casing 6, having one of its sides extended laterally to form an auxiliary casing 7. The casing 6 is to be rigidly connected to the frame of an automobile in any desired manner. The casing 6 has arranged centrally therein, a main support 7, which is rigidly connected to one side of said casing 6 in any desired manner. This main support is provided with a cylindrical axial opening 8, registering with a corresponding opening 9, formed upon the near wall of casing 6. The opening 8 extends transversely of the casing 6, to rotatably hold a transverse driven shaft 10, which is preferably to serve as the rear axle of the automobile. The auxiliary casing 7 is provided centrally thereof, with an opening 11, in alinement with the opening 8. The auxiliary casing 7 is further provided centrally thereof with a cylindrical extension 11'; surrounding the opening 11 and having a bore 13 of greater diameter than the opening 11. This cylindrical extension 11', is provided upon its end with an annular flange 13', forming a cylindrical opening 14, in alinement with and of the same diameter as the opening 11. A tubular shaft 15 is rotatably mounted upon a portion of the transverse driven shaft 10, within the auxiliary casing 7, and this tubular shaft is journaled through the openings 14 and 11, as clearly shown in Fig. 2. The cylindrical extension 11', contains cylindrical roller bearings 16, which engage the tubular shaft 15 to prevent excessive friction. Within the auxiliary casing 7 is arranged a differential gear mechanism to coöperate with the shaft 10, and the tubular shaft 15. This differential gear mechanism comprises a cylindrical casing 17 of a suitable size to rotate within the auxiliary casing 7. This cylindrical casing 17 is provided with an outwardly extending annular flange 18 which is bolted or otherwise rigidly secured to the disk 2, as shown at 19, to cause said cylindrical casing to rotate with the said disk. A bevel-gear 20 is disposed within the auxiliary casing 7 adjacent the driven disk 2, and is provided with a cylindrical hub 21, a portion 22 of which is rotatably mounted within an opening 23 formed through the central portion of the driven disk 2. The bevel-gear 20 is arranged upon the driven shaft 10 and rigidly connected therewith, as shown at 24. The bevel-gear 4, as above stated is rigidly connected to the driven disk 3, and this bevel-gear is further rotatably mounted upon the driven shaft 10. It will thus be seen, that the driven disk 2 is free to rotate with relation to the driven shaft 10.

Arranged within the auxiliary casing 7, and opposite the bevel-gear 20, is a corresponding bevel-gear 25, which is provided with a tubular hub 26 disposed upon the tubular shaft 15 and extending inwardly to engage the hub 21 of the bevel-gear 20, whereby said bevel-gears 20 and 25 are retained in their proper spaced relation to each other. The bevel-gear 25 is rigidly connected with the tubular shaft 15 as is shown at 27. The cylindrical casing 17 is provided at diametrically opposite points, with stud shafts 28, upon which are rotatably mounted planet bevel-gears 29, which mesh with the bevel-gears 20 and 25.

As above stated, the driven shaft 10 is to preferably form the rear axle of an automobile, and this shaft has rigidly secured thereto one of the rear wheels of the vehicle. The other rear wheel of the vehicle is to be rigidly connected to the tubular shaft 15.

It should be understood that the driven disk 2 is to be rotated at different rates of speed and in opposite directions, by means of transmission gears to be described, which rotation of said disk will be imparted to the driven shaft 10 and tubular shaft 15, by virtue of the differential gear mechanism above described. The operation of a differential gear mechanism is commonly well known, and it is thought that a detailed description of the differential gear mechanism hereinabove described would be superfluous.

Arranged below the driving shaft 1, are counter and counter reverse shafts 30 and 31 respectively, having their inner ends journaled within openings 32 formed upon the main support 7. The shafts 30 and 31 are disposed in end to end relation to each other and extend diametrically across the driven disk 2 in a parallel relation to the driving shaft 1. The outer ends of the shafts 30 and 31 are journaled through openings 33 formed in the ends of the casing 6, and roller bearings 34 are arranged within these openings to coöperate with said shafts. The driving shaft 1 is provided near its rear end with a pinion 35, which may be rigidly connected therewith as shown at 36. As shown in Fig. 1, the rear end of the driving shaft 1 extends through an opening formed in a suitably fixed support 37, and roller bearings 38 are arranged within the opening to engage the shaft 1. The counter shaft 30 is provided near its outer end with a relatively large pinion 39, which is fixedly secured to the shaft 30 and disposed to be in constant mesh with the pinion 35. It is thus obvious that the counter shaft 30 is constantly rotated by the shaft 1, but in opposite direction to the same. Arranged below the shafts 30 and 31 is a connecting shaft 40, which is rotatably mounted through fixed supports 41, and is free to rotate therein but is not capable of having longitudinal movement. The connecting shaft 40 is provided at its ends with pinions 42 and 42' which are fixedly secured to said shaft by any desired means. The function of the connecting shaft 40 and its pinions 42 and 42' will be apparent hereinafter.

The driven disk 2 is provided with a beveled annular section 43, as clearly shown in Fig. 2. This disk is further provided near its periphery with a plurality of inwardly extending pins 44, which are disposed at equal spaced intervals and serve as gear teeth. A clutch device or head 45 is splined, as shown at 46, upon the counter shaft 30, whereby the same is free to be moved longitudinally of the shaft 30 but is locked from having rotation upon the same. The clutch head 45 has a portion 47 thereof, provided with teeth 48 thereby forming a pinion. The inner end of the clutch head 45 is provided with a clutch face 49 adapted to coöperate with a clutch member 50 formed upon the outer end of a bevel-gear 51, which is rotatably mounted upon the inner end of the counter shaft 30. The bevel-gear 51 is in constant mesh with the bevel-gear 4, it being understood that said bevel-gear 51 is not capable of longitudinal movement upon its shaft 30. It is the function of the clutch head 45, when moved forward sufficiently, to engage the clutch member 50 and accordingly lock the bevel-gear 51 against rotation upon the shaft 30. The means for moving the clutch head 45 will be explained hereinafter. The reverse counter shaft 31 is provided near its inner end with a pinion 52, which is fixedly secured to the same by any desired means. The pinion 52 is free from engagement with the bevel-gear 4, as clearly illustrated in Fig. 2, while the same is in constant mesh with the pinion 42'. A bevel-friction pulley 53 is splined as shown at 54, upon the reverse counter shaft 31, for coöperation with the beveled section 43 of the driven disk 5. This pulley 53 comprises a tubular body portion 55, provided near its center with an annular flange 56, and at its ends with screw threads 57. A friction member 58 is disposed upon the body portion 55, and a ring 59 screwed upon the inner end 57, the flange 56 and ring 59 being connected by screws 60. A ring 61 is screw threaded internally and is arranged upon the outer end of the body portion 55, the same being spaced from the flange 56 to form a recess for the reception of means to move the pulley 53 longitudinally of the shaft 31, in either direction, into or out of engagement with the disk 5.

When the parts of my device are in the positions as illustrated in the drawings, said device is then in its inoperative condition, or in other words the rotation of the driving shaft 1 is not imparted to the transverse driven shaft 10 or tubular shaft 15. The pinion 47 is in contact with the pinion 42, whereby the reverse counter shaft 31 is rotated in the same direction as the counter shaft 30. However, the reverse friction pulley 53 is in its inoperative position or out of engagement with the driven disk 2, whereby the rotation of the reverse counter shaft is not imparted to said disk.

I will now proceed to explain the means for moving the clutch head 45 and the reverse friction pulley 53 longitudinally upon their respective shafts. In this connection, special attention is called to Fig. 3, wherein is shown a swinging controlling lever 61, provided with a latch device 62 adapted to coöperate with a segmental rack 63 provided with a plurality of notches 64, 65, 66, and 67. The controlling lever 61 has rigidly connected to its lower end a stripped gear 68, which is accordingly adapted to be partially rotated in opposite directions. Gears 69 and 70 are arranged upon opposite sides of the gear 68 and engage the same at substantially diametrically opposite points. It is to be understood that the gears 68, 69 and 70 are pivotally supported by desired means. The gears 69 and 70 are provided respectively, with short and long levers 71 and 72, which extend downwardly and are rigidly connected to the same by suitable means. The levers 71 and 72 are connected by means of a retractile coil spring 73. The short lever 71 has pivotally connected to its free end as shown at 74, one end of a connecting rod 75, said connecting rod extending rearwardly for engagement with a shifting member 76, which is suitably connected to the reverse pulley 53. This shifting member comprises an annular body portion 77, loosely mounted upon the body portion 55 of the pulley 53 and disposed within the recess formed between the flange 56 and the ring 61. The annular body portion 77 is provided with an upstanding arm 78, which is provided with a head 79. This head is provided with an opening 80, for the reception of the rear end of the connecting rod 75. The connecting rod 75 is screw threaded at its rear end as shown at 81, for the reception of nuts 82, which clamp said connecting rod to the head 79. The lever 72 has pivotal connection, as shown at 83, with a connecting rod 84, which is disposed for the greater portion of its length below the connecting rod 75, and is bent upwardly as shown at 85 to extend rearwardly out of engagement with the bevel gear 51 to be connected to a shifting device 86. This shifting device comprises an annular body portion 87, which is loosely mounted in a groove 88 formed upon the periphery of the clutch head 45. The annular body portion 87 is provided with an upstanding arm 89, having a head 90 formed thereon, which is apertured as shown at 91 for loosely receiving the driving shaft 1. This head 90 is further provided with an opening 92, for the reception of the rear end of the connecting rod 84. This rear end is screw threaded as at 93 for the reception of nuts 94, which clamp connecting rod 84 to the head 90.

In the operation of the device, when the controlling lever is arranged, as shown in Fig. 3, so that its latch device 62 coöperates with the notch 65, which may be termed the neutral notch, the other parts of the device will be in the position illustrated in Figs. 1 and 2 and the shafts 10 and 15 will not be rotated by the driving shaft 1, as above stated. When the controlling lever 61 is oscillated forwardly until the latch device 62 is disposed within the notch 66, which may be termed the forward low speed notch, the short lever 71 will be oscillated forwardly to cause the reverse friction pulley 53 to be moved away from the disk 2, and the long lever 72 will be oscillated forwardly to cause the clutch-head 45 to move toward the clutch member 50 and the pinion 47 to move forwardly to engage the pins 44 of the disk 2. This driven disk is accordingly rotated at forward low speed. When the controlling lever is oscillated still farther in a forward direction until said latch device 62 is disposed within the notch 67, which may be termed the forward high speed notch, the levers 71 and 72 are again oscillated rearwardly, which results in the reverse friction pulley 53 being moved farther away from the disk 2, and the clutch head 45 is advanced to engage the clutch member 50 and the bevel gear 51 locked to the counter shaft 30. Owing to the difference in the diameter of the bevel gear 4 and the disk 2, and the size of the pinion 47 and the bevel gear 51, it is obvious that said disk will be rotated at a much higher rate of speed. When the clutch head 45 is advanced sufficiently to engage the clutch member 50, the pinion 47 has previously been moved out of engagement with the pins 44, and hence there is no conflict in this respect. If it should now be desired to drive the driven disk 2 at reverse low speed, the controlling lever is first returned to its normal or neutral position and then oscillated rearwardly so that the latch device 62 may fit within the opening 64, termed the reverse low speed notch. This rearward movement of the controlling lever, causes the levers 71 and 72 to be oscillated rearwardly, whereby the reverse friction pulley 53 is urged into an engagement with the annular beveled section 43 of the driven disk 2, and at the same time the pinion 47 is made to move farther away from said disk 2. It is worthy of note that the pinion 42 is formed sufficiently thick so that the same remains in constant mesh with the pinion 47 during the last named rearward movement of the same. In this manner the driven disk 2 may be rotated in a reverse direction and at low speed.

It is to be understood that the form of my invention herewith shown and described is to be taken as a preferred example of the same, and that certain changes may be made in the shape, size and arrangement of parts, without departing from the spirit of my invention.

Having fully described my invention, I claim:—

1. In apparatus of the character described, a driving shaft, a disk, a plurality of driven shafts arranged in end to end relation to each other, means for imparting rotation from the driving shaft to one of the driven shafts, means for imparting rotation from one of the driven shafts to the other driven shaft, a clutch device slidably mounted upon one of the driven shafts and provided with means to rotate said disk, a gear loosely mounted upon the last named driven shaft to rotate said disk at a different speed, said clutch device serving to lock said gear to its shaft, and a gear mounted upon the other driven shaft to rotate said disk in an opposite direction.

2. In apparatus of the character described, a driving shaft, a disk, a plurality of driven shafts, means for imparting rotation from the driving shaft to one of the driven shafts, means for imparting rotation from one of the driven shafts to the other driven shaft, a clutch device slidably mounted upon one of the driven shafts and provided with means to rotate said disk, a gear loosely mounted upon the last named driven shaft to rotate said disk at a different speed, said clutch device serving to lock said gear to its shaft, a gear mounted upon the other driven shaft to rotate said disk in an opposite direction, and means for moving said clutch device and last named gear in opposite directions.

3. In apparatus of the character described, a driving shaft, a driven shaft, a disk arranged in operative relation to the driven shaft, said disk being provided with inner and outer concentric circles of gear teeth, a clutch device splined upon the driven shaft, a pinion connected to said clutch device to engage the outer circle of gear teeth, a gear loosely mounted upon the driven shaft to engage the inner circle of gear teeth, and said clutch device serving to lock said gear to its shaft.

4. In apparatus of the character described, a driving shaft, a disk arranged in operative relation therewith, a plurality of counter shafts to be driven by the driving shaft, a connecting shaft to coöperate with said counter shafts, said disk being provided with outer and inner circles of teeth, a gear rotatably mounted upon one of the counter shafts and disposed to mesh with the inner circle of teeth, a device splined upon the counter shaft and provided with means to engage the outer circle of teeth, said device being capable of locking said gear to said counter shaft, a gear splined upon the other counter shaft to engage said disk, means to effect the longitudinal movement of said device and the last named gear, including swinging levers, and common means to swing the same in the same direction.

In testimony whereof I affix my signature in presence of two witnesses.

CHARLES M. LEECH.

Witnesses:
WALTER J. RICHIE,
CLARENCE C. MILLER.